Feb. 18, 1930.　　A. H. KATTERJOHN　　1,748,021
CHUCK STRUCTURE
Filed Oct. 24, 1927　　2 Sheets-Sheet 1
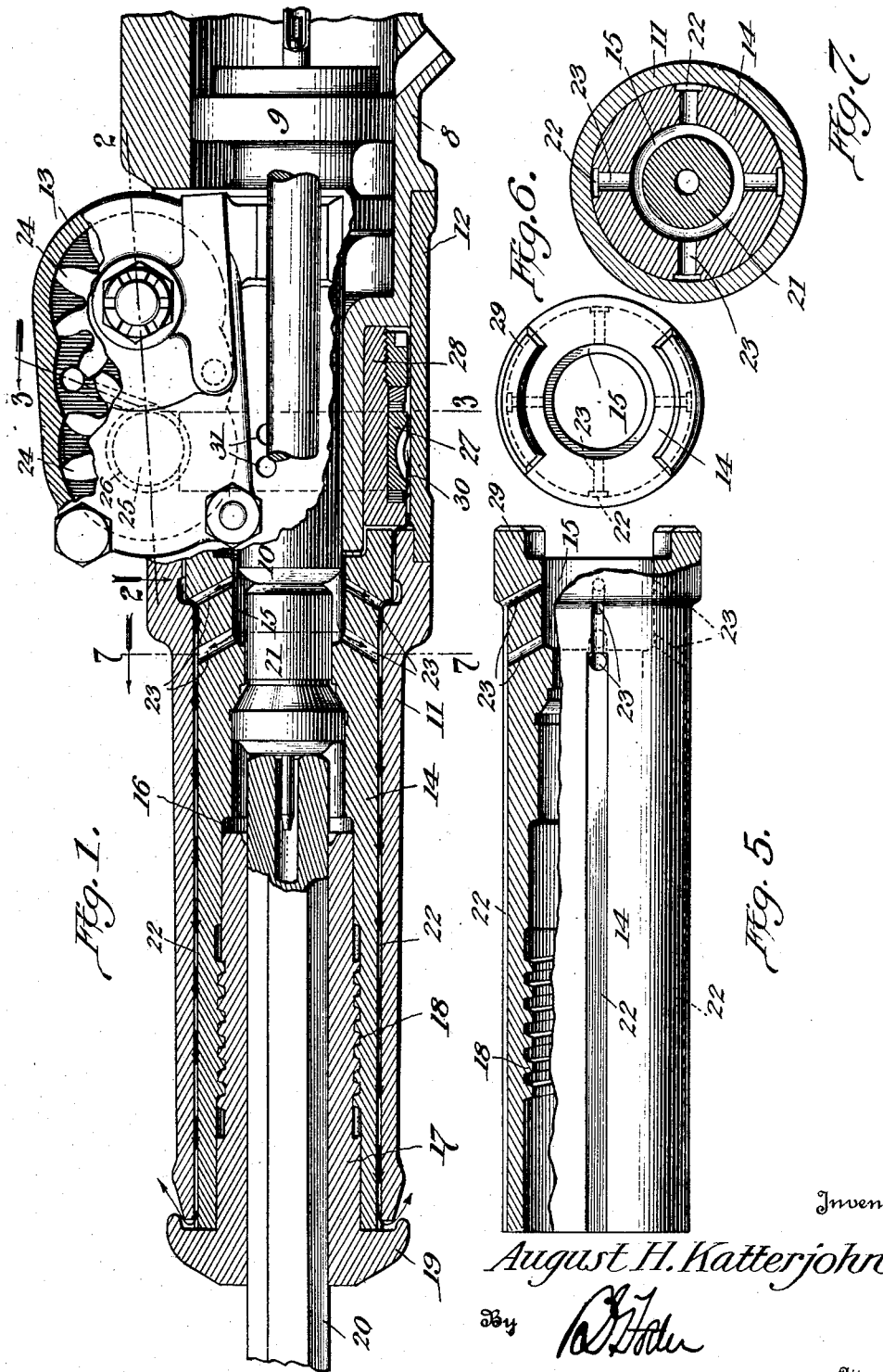
Inventor,
August H. Katterjohn.
By
Attorney

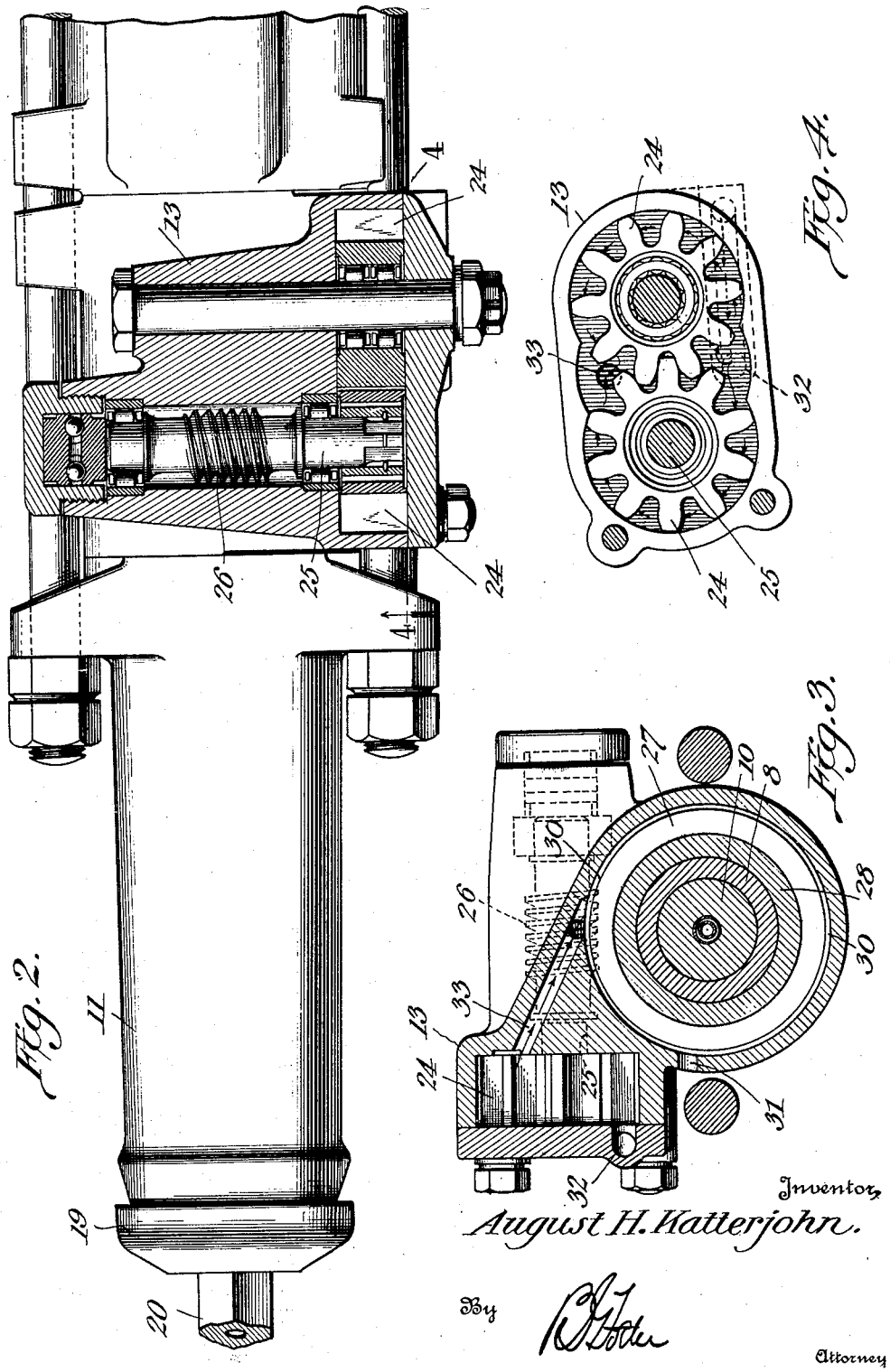

Patented Feb. 18, 1930

1,748,021

UNITED STATES PATENT OFFICE

AUGUST H. KATTERJOHN, OF DENVER, COLORADO, ASSIGNOR TO GARDNER-DENVER COMPANY, OF DENVER, COLORADO, A CORPORATION OF DELAWARE

CHUCK STRUCTURE

Application filed October 24, 1927. Serial No. 228,355.

The present invention relates to chuck structures for rock drills and similar tools, and the principal object is to provide means whereby the working parts can be kept clear of dirt, thus eliminating much wear that otherwise takes place, and incidentally to secure proper lubrication of the moving elements.

An embodiment of the invention applied to drills in which the chuck is rotated by a motor other than the drilling motor, is illustrated in the accompanying drawings, wherein:

Figure 1 is a longitudinal sectional view through the main portion of the drill, Figure 2 is a top plan view with the chuck rotating motor shown in section and taken substantially on the line 2—2 of Figure 1, Figure 3 is a cross sectional view on the line 3—3 of Figure 1, Figure 4 is a detail sectional view showing the drill rotating motor in elevation and taken on the line 4—4 of Figure 2, Figure 5 is a view partially in elevation and partially in section of the chuck sleeve, Figure 6 is a rear elevation of said chuck sleeve, Figure 7 is a cross sectional view on the line 7—7 of Figure 1.

The drill structure shown consists of a cylinder or barrel 8, in which is a reciprocatory hammer piston 9, having a reduced hammer extension 10. A chuck housing 11 is located in advance of the barrel 8, and interposed between the two is a spacer 12, on which is formed the casing or cylinder 13 of the chuck rotating motor.

In the housing 11 is a rotatable chuck sleeve 14 provided at its rear end with an internal chamber 15, having communication with a socket 16 that opens through the front end of the sleeve. A chuck 17 is fitted into the socket and preferably has a screw threaded engagement 18 therein. This chuck is provided at its outer end with a terminal flange 19 that overlies the sleeve 14 and the housing 11, and constitutes a dirt shield that is spaced from the front end of the housing, as clearly shown in Fig. 1. The chuck is designed to receive the rear end of a drill steel 20. Projecting into the front end of the rear internal chamber 15 of the chuck sleeve 14 is a tappet 21, against the front end of which the steel 20 abuts, the rear end being struck by the hammer extension 10 of the piston 9 that thus enters the rear end of the chamber 15.

The chuck sleeve 14 is provided in its external face with a plurality of longitudinally disposed grooves or channels 22 that are open at the front end of the sleeve, and are thus in communication with the space behind the dirt shield 19. The rear ends of these channels are in communication with the chamber 15 of the chuck sleeve through ports 23.

The chuck rotating motor consists of the casing 13 and intermeshing piston gears 24 located in the casing. One of these piston gears is mounted on a shaft 25 carrying a worm 26 and this worm is in mesh with a worm gear 27 that is mounted on a rear head or sleeve 28. The sleeve 28 has an interlugged connection 29 with the rear end of the sleeve 14. Consequently when the motor is in operation, the sleeve 14, the chuck 17, and the drill steel 20 will be rotated. The worm gear 27 operates in a chamber 30, and this chamber, as shown in Figure 1, has open communication with the grooves 22 of the chuck sleeve. The chamber furthermore has one or more exhaust ports 31 opening directly to atmosphere.

Motive fluid is supplied to the chuck rotating motor through a passageway 32 that opens on the lower side of the intermeshing gear pistons 24 (see Fig. 4), and from the outer or upper side of said intermeshing portions of the gear pistons, an exhaust passageway 33 leads to the upper side of the worm gear chamber 30, as shown in Figure 3.

With this construction, air exhausting from the drill rotating motor will pass into the worm gear chamber 30. Part will then exhaust to atmosphere through the ports 31, but the ports are not of sufficient size to allow it all to thus exhaust, so that part will be directed around the rear end of the chuck sleeve 14 into the chamber 15, and thence through the ports 23, to the channels 22. Part, as indicated by the arrows in Figure 1, will pass around the exterior of the chuck sleeve 14 into said channels. As a result, there is constant outflow of air through the channels, and as the chuck rotates, it will keep the bearing between the chuck sleeve and housing 11 clean, and will prevent the entrance of dirt into such bearing.

As is well known, it is the common practice at the present time to introduce lubricant into the air supply stream, either by line oilers or at the point of introduction of air into the machine. The oil-laden air, which is directed as above described through the bearings, serves to adequately lubricate the same.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In a fluid actuated tool, the combination with a chuck housing and a chuck sleeve rotatable therein having an internal chamber, said sleeve having external longitudinal grooves opening through its front end and ports connecting the chamber and rear ends of the grooves, of a motor for rotating the chuck sleeve, means for supplying motive fluid to the motor, and means for directing a part of the exhaust to atmosphere and a part to the chamber and thence to the grooves.

2. In a fluid actuated tool, the combination with a chuck housing and a chuck sleeve rotatably mounted therein and having an internal chamber, said chuck sleeve having external longitudinal grooves opening at its front end and ports connecting the chamber and the inner ends of the grooves, of a motor for rotating the chuck sleeve, a driving worm rotated by the motor, a worm gear engaged and driven by the worm and connected to the chuck sleeve, a chamber in which the worm operates that is in communication with the chuck sleeve chamber, means for supplying motive fluid to the motor, and an exhaust passageway for the motive fluid leading from the motor to the worm gear chamber.

3. In a fluid actuated tool, the combination with a chuck housing and a chuck sleeve rotatably mounted therein and having an internal chamber, said chuck sleeve having external longitudinal grooves opening at its front end and ports connecting the chamber and the inner ends of the grooves, of a motor for rotating the chuck sleeve, a driving worm rotated by the motor, a worm gear engaged and driven by the worm and connected to the chuck sleeve, a chamber in which the worm operates that is in communication with the chuck sleeve chamber, means for supplying motive fluid to the motor, and an exhaust passageway for the motive fluid leading from the motor to the worm gear chamber, said worm gear chamber having an exhaust port to atmosphere that permits a portion only of the exhaust to pass therethrough, the remainder passing through the sleeve chamber and external grooves to atmosphere.

4. In a fluid actuated tool, the combination with a chuck housing and a chuck sleeve rotatably mounted therein and having an internal chamber, said chuck sleeve having external longitudinal grooves opening at its front end and ports connecting the chamber and the inner ends of the grooves, of a chuck in the chuck sleeve having a dirt shield overhanging the front end of the chuck housing, a tappet in the front end of the chuck sleeve chamber, a drilling piston movable into the rear end of the sleeve chamber and operating on the tappet, a motor for rotating the chuck sleeve, a driving worm rotated by the motor, a worm gear engaged and driven by the worm and connected to the chuck sleeve, a chamber in which the worm operates that is in communication with the chuck sleeve chamber, means for supplying motive fluid to the motor, and an exhaust passageway for the motive fluid leading from the motor to the worm gear chamber.

In testimony whereof, I affix my signature.

AUGUST H. KATTERJOHN.